United States Patent

Serrie et al.

[15] 3,680,229
[45] Aug. 1, 1972

[54] APPARATUS TO MATCH LEVELS OF READING ABILITY TO CORRESPONDING LEVELS OF READING MATTER

[72] Inventors: Shelagh Serrie, 81 Pattagansett Road; Seamus McGrady, 75 Columbus Ave., both of Niantic, Conn. 06357; Richard Bloomer, R.D. 02, Willimantic, Conn. 06226

[22] Filed: June 16, 1971

[21] Appl. No.: 153,610

[52] U.S. Cl. .................................. 35/35 R, 116/119
[51] Int. Cl. ............................................ G09b 17/00
[58] Field of Search ........... 35/35 R, 35 E; 40/6, 330; 283/38, 40, 42; 116/119

[56] References Cited

UNITED STATES PATENTS

| | | | |
|---|---|---|---|
| 1,816,642 | 7/1931 | Fetter | 40/330 |
| 3,619,920 | 11/1971 | Needleman | 40/2 G |
| 813,748 | 2/1906 | Smith | 283/42 |
| 1,278,259 | 9/1918 | Tremaine | 283/42 |
| 1,364,527 | 1/1921 | Schubel | 187/97 |
| 2,465,616 | 3/1949 | Sziklai | 281/32 |

FOREIGN PATENTS OR APPLICATIONS

| | | | |
|---|---|---|---|
| 900,612 | 10/1944 | France | 283/20 |
| 691,325 | 7/1964 | Canada | |
| 598,044 | 2/1948 | Great Britain | |

*Primary Examiner*—Wm. H. Grieb
*Attorney*—Sydney B. Schlessel

[57] ABSTRACT

Apparatus for matching a student's reading level to particular book readability comprising two series of distinctive corresponding symbols, with one of the first series assigned to a student on the basis of his reading level and one of the second series to each book on the basis of its reading difficulty, identical symbols of the two series indicating that a particular book meets the reading level of the student.

5 Claims, 5 Drawing Figures

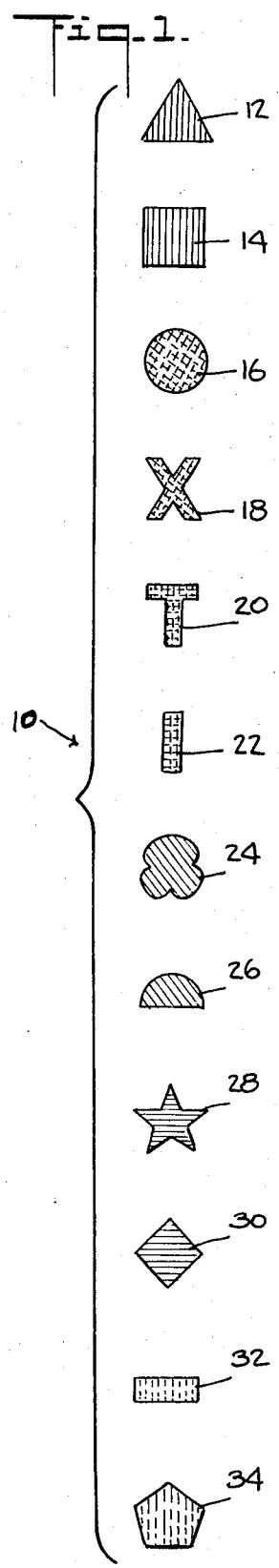
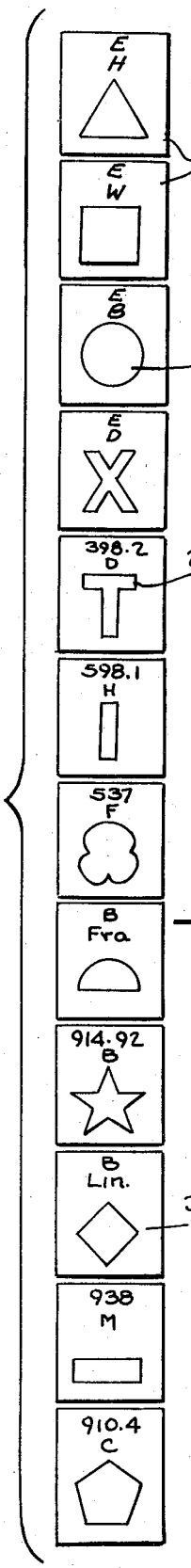
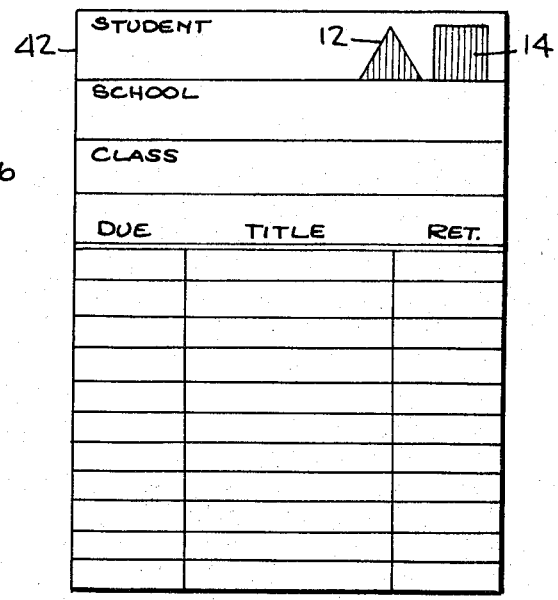
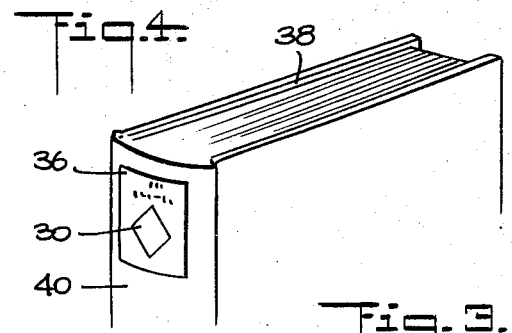
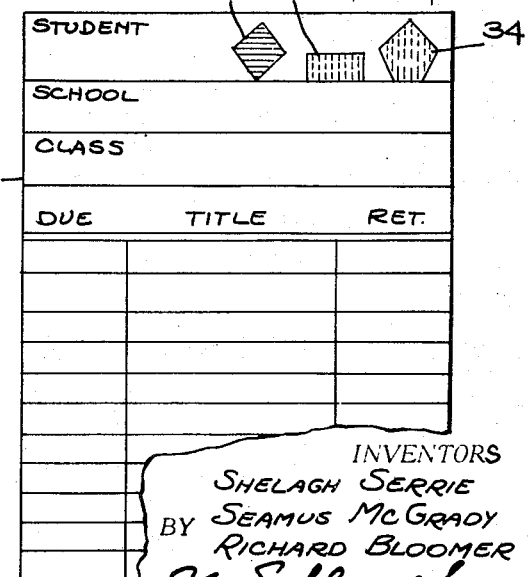

APPARATUS TO MATCH LEVELS OF READING ABILITY TO CORRESPONDING LEVELS OF READING MATTER

BACKGROUND OF THE INVENTION

1. Field of the Invention

This invention relates to the field of education, and has for its objective the creation of an apparatus and system of correlating, or matching, the reading level of individual students, from primary grade level up to junior high school grade levels, with the reading difficulty of library books, texts and the like, so that the individual student can select, read and fully comprehend books of sufficient complexity to match his current reading and comprehension abilities, but which are not beyond such capabilities. This objective is realized by the provision of identifying symbols which are individually assigned to books on the basis of their readability as determined by computerized formula, and of a series of identical graduated identifying symbols which are individually assigned to the students on the basis of a short oral reading test of similar material, that may be administered to each student by a librarian, teacher or other similarly qualified person, the identical book and student symbols indicating that the student is capable of reading and understanding the particular book.

2. Prior Art

In the present state of the art books are generally graded for student use on the basis of the student's school grade, i.e., certain books are graded for fourth grade students, certain books for fifth grade students, and so forth. It is general and common knowledge that all students in a particular school grade do not have identical reading levels. For example, one student in the fifth school grade may have seventh grade reading ability, while another may have only fourth grade reading ability. Consequently, with identical reading matter assigned to both students, the former will not be able to realize his full potential for educational growth, while the latter will be retarded by being unable to cope with the assigned material. The express importance of the present invention lies in its capacity to afford every student, regardless of his current school grade, the opportunity to progress educationally in accordance with his current abilities.

BRIEF SUMMARY OF THE INVENTION

Our invention comprises the provision of a series of symbols, each symbol being readily distinguishable from the others, with a single symbol assigned to a student on the basis of his reading and comprehension level as determined by suitable oral test, and a second series of corresponding symbols, with a single symbol assigned to each book on the basis of its readability as determined by a computerized formula, the matching student and book symbols indicating that the student has the ability to read and understand the designated book.

The principal object of our invention, therefore, lies in the provision of a series of different and readily distinguishable symbols provided for assignment to students, and a similar series for textual matter, such as library books and the like, whereby identical symbols of each series indicate that the specific book is appropriate reading material for the specific student.

A second important object of our invention lies in the provision of two series of distinctive symbols, as above-described, by which the student may be able to readily select not only such reading matter as matches his reading level, but is also able to select reading matters which is progressively slightly above or below his reading level.

A third important object of our invention lies in the provision of distinctive symbols, as above described, by which educators may be enabled to assign reading material to students on the basis of their actual individual capabilities rather than on the basis of their school grades.

A fourth important object of our invention lies in the provision of distinctive symbols, as above described, which can easily be adapted and used by existing libraries and schools without modification or change of existing methods of classification of books.

Still another important object of our invention lies in the provision of distinctive symbols, as above described, together with a method to match corresponding reading levels to corresponding book readability, for the promotion of better and progressive reading habits.

Yet another important object of our invention lies in the provision of a system, as above described, which makes it easy for a student to recognize promptly the books which are within the bounds of his capabilities.

These and other salient objects, advantages and functional features of our invention, together with the novel features of construction and arrangement of parts, will become more readily apparent from an examination of the following specification, taken with the accompanying drawings, wherein:

BRIEF DESCRIPTION OF THE DRAWINGS

FIG. 1 is a face view of the distinguishing symbols employed in a preferred embodiment of our invention, for assignment to students;

FIG. 2 is a face view of the identical symbols (color omitted but intended) of FIG. 1, imprinted on tabs to be attached to designated book spines;

FIG. 3 is a side perspective view, partly broken, of a book having one of the tabs of FIG. 2 secured on its spine;

FIG. 4 is a face view of a student library card; and

FIG. 5 is a face view of another student's library card.

Similar reference characters designate similar parts throughout the different views.

DETAILED DESCRIPTION OF THE INVENTION

Illustrative of the preferred embodiment, there is shown in FIG. 1 a series of symbols 10 comprising a total of 12 symbols, each of which is distinguishable from the rest by specific shape and color, each of which is representative of a specific reading level, ranging from low first school grade to ninth grade and up, as designated in present school systems. Thus the red triangle 12 represents low first grade, the red square 14 high first grade, the orange circle 16 low second grade, the orange X 18 high second grade, the yellow T 20 low third grade, the yellow vertical rectangle 22 high third grade, the green clover leaf 24 fourth grade, the green half circle 26 fifth grade, the blue star 28 sixth grade, the blue diamond 30 seventh grade, the purple horizontal rectangle 32 eighth grade and the purple pentagon 34 ninth grade and up.

In FIG. 2 there are shown the corresponding symbols 12–34, inclusive, with identical colorings (not shown), each of which is shown imprinted on an individual tab 36 adapted to be adhesively affixed to the spine 40 of a particular book 38, as shown in FIG. 3.

In FIG. 3 there is shown the book 38 on whose spine 40 there is affixed a tab 36 showing the symbol 30, which designates its level of readability to correspond to seventh grade reading level.

FIG. 4 shows a student's library card 42 displaying the symbols 12 and 14, indicating the student's reading level to be high first grade but also that books of low first grade readability are also suitable.

FIG. 5 shows another student's library card 44 displaying the symbols 30, 32 and 34, signifying the student's reading level to be eighth grade, but also signifying that the student may suitably read books of seventh and ninth grade readability.

The symbols 10 of our invention are likewise applied to the faces of the libraries' author, title and subject cards, as well as to the book card reposing in the pocket of the book, these cards being too well known in the art of library classifications and indexing to require further elaboration here. Thus the specifically applicable symbol 10 may be applied to these cards next to the existing Dewey Decimal Number system of classification, as shown in FIG. 2, so that present card and indexing systems may be continued with the addition of our invention, and without the necessity of replacement or additional expense.

METHOD OF OPERATION OF OUR INVENTION

This invention requires the determination of readability of books by computerized formula, which assures speed, accuracy and a great number of variables to insure such accuracy, and by a short oral test of each student's reading level, to be scored by a librarian, teacher or other qualified person, in which the student reads aloud brief passages of books previously scored for difficulty by the computer formula until he reaches one that is too difficult for him to read with accuracy and comprehension. He is then assigned the symbol level of the most difficult passage he could master, and the appropriate symbol 10.

Readability of a book is determined by reading into the computer random passages of the book (the entire book may also be read in). The computer will calculate the reading difficulty of each separate passage and/or of the total book, from which it will be assigned a symbol 10 corresponding to the symbol 10 assigned to the student who is capable of reading and mastering the book. Thus, a book that has a readability level of eighth grade will be assigned the symbol 32, and any student who has been assigned a symbol 32 will know that the book is suitable for him.

Readscore, for example, is a series of computer programs designed to determine the reading difficulty of textual matter by examining certain stylistic variables. Readability formula have been in common use since 1923, with the Washburn Roblee formula. Such variables will include:

1. Average sentence length.
2. Average paragraph length.
3. Average standard deviation of word length.
4. Average number of prepositional phrases.
5. Word length load factor.
6. Average number of connectives.
7. Type-token ratio.
8. Phonetic discriminability.
9. Adjective load.
10. Common words.

Following the scoring of each book for readability in accordance with the computerized formula, as above described, the assignment to the book of the appropriate symbol 10 according to its readability, the symbol 10 will be placed upon the book spine 40 as well as on the author, title, subject and book pocket cards. The student will then be orally tested, as above described, with passages taken from books of graduated difficulty already scored, until he reaches a passage he cannot master. He will then be assigned the symbol 10 corresponding to the next lower level of difficulty, as assigned to the book from which the passage was taken, with the appropriate symbols secured on his library card. He will thus know what particular books are suitable reading matter for him.

While the symbol 10 remains constant for each book, as the student progresses in reading level he will be assigned progressively the symbol 10 which signifies his increased reading level.

There is sufficient latitude in our invention to permit a student to select from among three levels of book readability. One level will correspond exactly with his reading level; the second level is one grade higher (allowing him to "stretch" his capacity); the third is one level or grade lower than his ability. The student's library card 44, except at the first two levels of difficulty (FIG. 4), will have three symbols 10 at one time (FIG. 5). The student at this time may read books marked with any of these symbols 10. As the student progresses from level to level he will automatically pick up a new symbol 10 and discard the lowest one from his library card.

In the preferred embodiment shown by the drawings, each symbol 10 is distinguishable from the rest by shape and color, with the colors, red to purple, following the progression of the spectrum. It is to be understood, however, that the embodiments shown are only by way of illustration and not of limitation, and that various changes may be made in construction, shapes and colors, and in the determination of reading levels and readability, without limitation upon or departure from the spirit and scope of the invention or sacrificing any of the advantages thereof inherent therein, all of which are herein claimed. For example there may be variations and substitutions in the shapes and designs of the symbols 10, which may take any form, so long as each series is composed of symbols individually distinguishable from the rest of the series, and a second series of symbols 10 corresponding to the first series. Further, the colors may be varied or even omitted, and other computer formulas may be employed to determine readability and reading levels, all within the scope of our invention, as hereinafter claimed.

It is also to be understood that, while an oral test to determine the student's reading level is preferred in our invention, a written test may be suitably substituted, i.e., a student is given a selected passage to read and his reading level determined by a written synopsis by the student, or his answers to written questions based on the contents of the passage, and thereafter graded on the basis of his accuracy and understanding.

Having described our invention, we claim:

1. An apparatus for matching students' reading achievement levels to book readability comprising two identical series of distinguishing symbols, with each symbol in a series distinguishable from the remainder in the series, symbols of the first series being selectively applied to student library cards and the like, and symbols of the second series being selectively applied to tabs, with each tab having means provided to secure the tab to a book, one symbol of the first series adapted to be assigned to a student on the basis of his reading achievement level and one symbol of the second series adapted to be assigned to a book on the basis of its readability, matching symbols of the two series indicating that the student is capable of reading and understanding the book.

2. An apparatus as described in claim 1, each of the symbols in a series characterized by a different geometric shape.

3. An apparatus as described in claim 2, each of the symbols in a series being differently colored, whereby no two symbols in the series have identical shape and color.

4. An apparatus as described in claim 1, identical symbols of the second series being also applied to identification records of the book to which the tab bearing the identifying symbol is secured.

5. An apparatus as described in claim 1, a plurality of symbols of the first series being applied to a student's library card and the like to designate an expanded range of reading achievement level to include the next higher and the next lower symbol in addition to the specific reading achievement level symbol.

* * * * *